(No Model.)
J. H. JONES.
PLOW.
No. 582,018. Patented May 4, 1897.
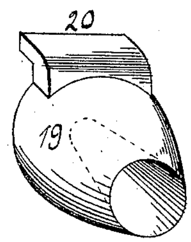
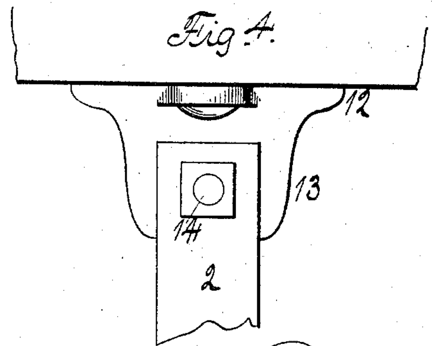
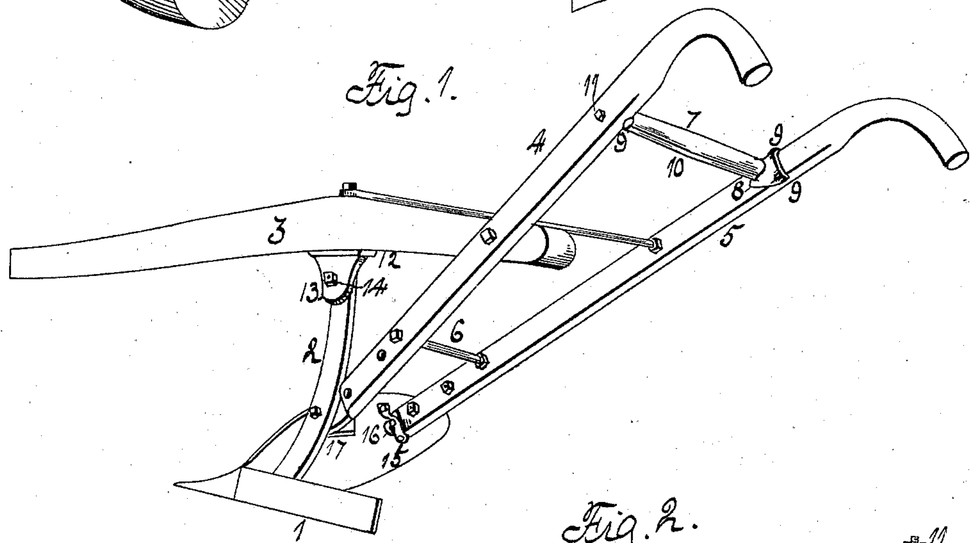
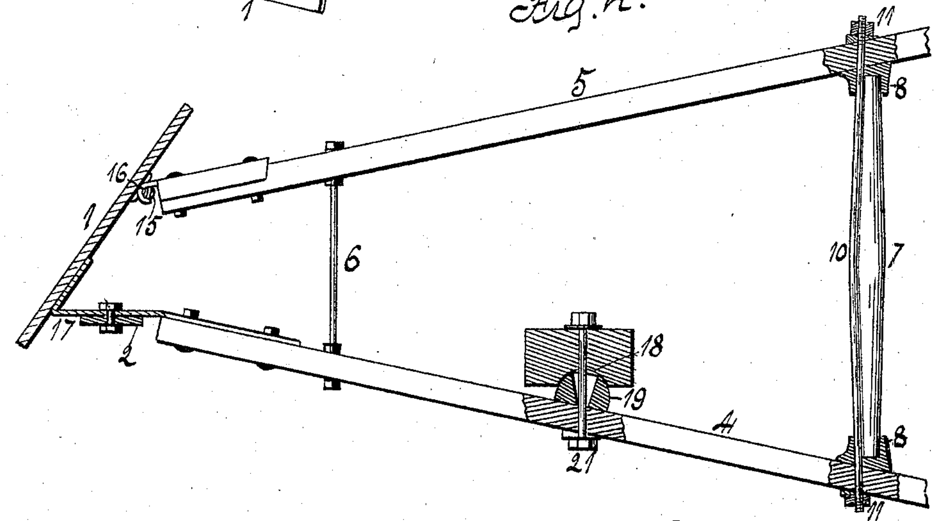
Witnesses:
I Sovereign.
E. Behel.
Inventor:
James Henra Jones.
By A. O. Behel.
Atty.
THE NORRIS PETERS CO., PHOTO-LITHO., WASHINGTON, D. C.

United States Patent Office.

JAMES HERVA JONES, OF ROCKFORD, ILLINOIS, ASSIGNOR TO THE EMERSON MANUFACTURING COMPANY, OF SAME PLACE.

PLOW.

SPECIFICATION forming part of Letters Patent No. 582,018, dated May 4, 1897.

Application filed October 27, 1896. Serial No. 610,248. (No model.)

*To all whom it may concern:*

Be it known that I, JAMES HERVA JONES, a citizen of the United States, residing at Rockford, in the county of Winnebago and State of Illinois, have invented certain new and useful Improvements in Plows, of which the following is a specification.

My invention consists in forming a universal-joint connection between the handle and moldboard, in forming a pivotal connection between the plow-standard and plow-beam, in forming a self-adjustable connection between the handle and beam, and in providing sockets for the ends of the round near the top of the handle held in place by a rod extending parallel with the round.

In the accompanying drawings, Figure 1 is a perspective view of a plow containing my improvements. Fig. 2 is a section in the lengthwise direction of the handle. Fig. 3 is an isometrical representation of the socket connection between the handle and plow-beam. Fig. 4 is an elevation of the connection between the plow standard and beam.

The plow 1 is of the usual construction, having a standard 2, connected to a plow-beam 3. Handle-bars 4 and 5 are connected together, one bar connected to the plow standard and beam, and the other bar connected to the moldboard of the plow.

The handle-bars are connected together by means of a brace 6, near their lower ends, and a round 7 at their upper ends. This round has its ends seated in sockets 8, and the sockets are placed against the inner faces of the handle-bars, having lugs 9, embracing the top and bottom faces of the bars. A rod 10, having its ends screw-threaded, extends parallel with the round and passes through holes in the sockets and handle-bars, receiving a nut 11 upon its projecting ends. In the old method large holes are bored through the handle-bars and the ends of the round are driven into these holes and secured with pins. This construction makes the round necessarily small at the ends, and the holes through the handles so large as to weaken them and endanger both round and handles when the usual strain is brought to bear upon them.

My invention dispenses with the large holes through the handles and affords means by which the ends of the round may be made as large as desired for ample strength. The round and handles are also much more easily repaired in case of breakage.

To the under face of the plow-beam is secured a bracket 12, having a depending projection 13. The upper end of the plow-standard 2 is secured to this projection by a bolt 14, passing through the parts. This construction allows the bracket to conform to the under face of the beam, to which it is attached at any varying angle at which the beam may be necessarily attached. The old method is to furnish a bracket on which the beam rests, and which is rigidly fastened to the top of the plow-standard by riveting or welding, and it is necessary to place the beam on the bracket in the position required and scribe and shave it by hand to fit the bracket. This weakens the beam by cutting away a part of its thickness at a point where it receives the most strain. It thus requires a great deal of extra work and the beams cannot be made to interchange with each other.

To the rear face of the moldboard is secured a clip 15, and to the end of the bar 5 of the handle is secured a hook 16, adapted to engage the clip, thus forming a universal-joint connection between the handle and plow, which allows the handle to be firmly fastened to the moldboard at any desired angle. In the old method a bracket or ledge is bolted rigidly to the moldboard, and the handle, after its angle to the moldboard is determined, is shaved or bent to conform to the bracket. No two moldboards are exactly alike in shape, as they twist or spring in tempering. Consequently the fitting of a handle to a plow in such a case cannot be done by machinery, or be duplicated or interchangeable work, but must be done by hand or scribe-rule.

The bar 4 of the handle has a connection with the plow-standard and moldboard by a bracket 17.

The rear end of the plow-beam, next the bar 4 of the handle, has a semispherical cavity 18, within which is located a casting having a semispherical projection 19 and a hooked projection 20. This casting is located against the inner face of the bar of the handle, the projection overlying the edge of the bar. When the handles have been adjusted as to height, a hole is bored through the bar 4 and plow-beam and a bolt 21 passed through the parts and through the casting, and a nut placed on the end of the bolt will clamp the parts together. This construction allows a great range of adjustment of beam and handle in relation to each other, as the casting can assume any position in the cavity of the beam that is required, and any variation of angles is readily provided. In the old method the beam and handle are temporarily clamped together, the beam scribed to the handle, and then shouldered and cut to the angles needed by hand to fit the handle. These angles are troublesome and slow to make, and no other beam or handle can replace them without being fitted by hand.

In the old way of making plows herein described each part must have a separate number stamped or marked thereon, so that the corresponding parts may be assembled at the end of shipment. There is often great trouble in a large mass in finding the parts for this purpose. It is plainly seen that my improvements obviate all this difficulty and furnish a perfect duplication of parts.

I claim as my invention—

1. In a plow, the combination of a mold-board, and a handle having a hook-and-eye connection.

2. In a plow, a plow-beam having a semi-spherical cavity in its side, a handle, a semi-spherical casting located within the cavity and against the inside of the handle, and a bolt holding the parts together.

3. In a plow, the combination of two handles, a round holding the handles separated, a socket placed between each end of the round and handles, and a bolt extending parallel with and exterior of the round and passing through the sockets and handles.

JAMES HERVA JONES.

Witnesses:

A. O. BEHEL,

E. BEHEL.